(12) United States Patent
Vivanco

(10) Patent No.: US 10,531,315 B2
(45) Date of Patent: Jan. 7, 2020

(54) MITIGATING HANDOVER ISSUES FOR GROUND-AERIAL HYBRID NETWORKS

(71) Applicant: AT&T Technical Services Company, Inc., Vienna, VA (US)

(72) Inventor: Daniel Vivanco, Sterling, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 0 days.

(21) Appl. No.: 15/982,158

(22) Filed: May 17, 2018

(65) Prior Publication Data

US 2019/0357061 A1 Nov. 21, 2019

(51) Int. Cl.
*H04W 24/02* (2009.01)
*H04W 36/16* (2009.01)
*H04W 76/19* (2018.01)
*H04W 36/00* (2009.01)

(52) U.S. Cl.
CPC ....... *H04W 24/02* (2013.01); *H04W 36/0083* (2013.01); *H04W 36/165* (2013.01); *H04W 76/19* (2018.02)

(58) Field of Classification Search
CPC ... H04W 24/02; H04W 36/165; H04W 76/19; H04W 36/0083
See application file for complete search history.

(56) References Cited

U.S. PATENT DOCUMENTS

| | | | |
|---|---|---|---|
| 8,249,585 B2 | 8/2012 | Tronc et al. | |
| 8,526,941 B2 | 9/2013 | Tseytlin et al. | |
| 9,191,869 B2 | 11/2015 | Marcum et al. | |
| 9,271,202 B2 | 2/2016 | Zhang et al. | |
| 9,313,702 B2 | 4/2016 | Virtej et al. | |
| 9,398,509 B1 | 7/2016 | Braun | |
| 9,560,536 B2 | 1/2017 | Ji et al. | |
| 9,693,268 B2 | 6/2017 | Park et al. | |
| 9,749,926 B2 | 8/2017 | Müller et al. | |
| 9,860,808 B2 | 1/2018 | Xiao et al. | |
| 2005/0265283 A1* | 12/2005 | Qi | H04W 36/22 370/331 |
| 2014/0247807 A1* | 9/2014 | Westerberg | H04W 36/34 370/331 |

(Continued)

*Primary Examiner* — Minjung Kim
(74) *Attorney, Agent, or Firm* — Amin, Turocy & Watson, LLP

(57) ABSTRACT

In modern networks, frequent handovers (e.g., ping-pong) from one AP device to another is a situation that can lead to increased latency, excessive resource utilization, poor quality of service, or radio link failure (RLF). Conventional networks employ mobility robustness optimization (MRO) procedures to balance tradeoffs between setting low thresholds before initiating a handover procedure, thereby increasing the likelihood of ping-pong issues, and setting those thresholds to higher values, thereby increasing the likelihood of RLF. Conventional MRO procedures are tailored to terrestrial-only networks and furthermore merely react to existing issues. Hybrid networks, having both terrestrial and aerial AP devices often witness ping-pong issues and may be implemented with urgency not conducive to using MRO procedures. An architecture is presented that can predict and mitigate ping-pong and other issues in connection with hybrid networks before those issues occur.

20 Claims, 10 Drawing Sheets

(56) References Cited

U.S. PATENT DOCUMENTS

| | | | |
|---|---|---|---|
| 2014/0364129 A1* | 12/2014 | Xiao | H04W 36/0085 |
| | | | 455/444 |
| 2015/0215831 A1* | 7/2015 | Jung | H04W 36/00837 |
| | | | 370/332 |
| 2015/0223084 A1* | 8/2015 | Lightstone | H04W 24/08 |
| | | | 370/252 |
| 2015/0264603 A1 | 9/2015 | Yang et al. | |
| 2016/0198377 A1 | 7/2016 | Centonza et al. | |
| 2017/0331600 A1 | 11/2017 | bin Samingan et al. | |
| 2018/0035345 A1 | 2/2018 | Chockalingam et al. | |

* cited by examiner

MITIGATING HANDOVER ISSUES FOR GROUND-AERIAL HYBRID NETWORKS

TECHNICAL FIELD

The present application relates generally to the field of communication networks and more specifically to mitigating handover issues for hybrid networks that utilize both ground access point devices and aerial access point devices.

BACKGROUND

Ground-based (e.g., terrestrial) access point devices such as conventional base stations and eNBs represent well known network infrastructure in use for several decades. Hybrid aerial and terrestrial wireless communication systems have recently emerged for public safety communications and tactical communications applications. These hybrid networks may utilize aerial access point devices to supplement the traditional coverage provided by the terrestrial access point devices

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1A:
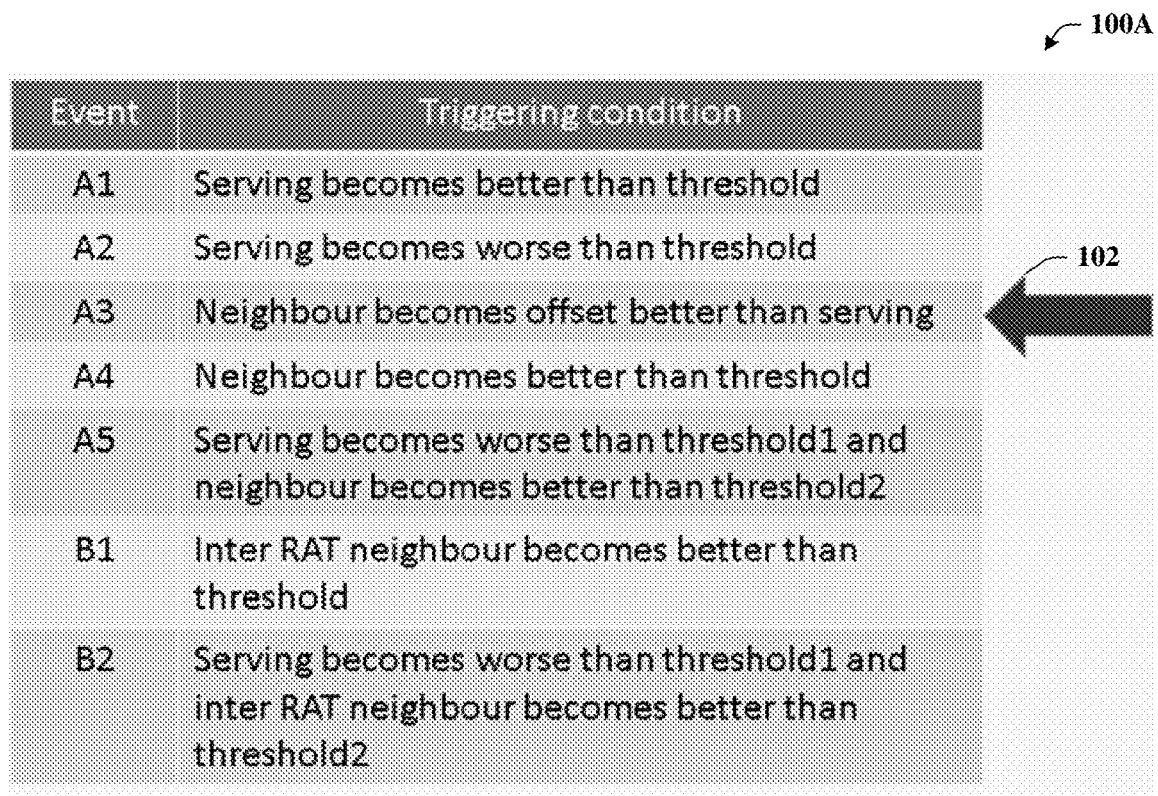
FIG. 1A depicts a block diagram of an example table illustrating common triggering condition summaries for various events in accordance with certain embodiments of this disclosure.

As used herein, "terrestrial access point device" and/or "ground access point device" is intended to refer to access point devices that are stationary in use and that tend to have static coverage areas that do not substantially change in terms of location. An "aerial access point device" or "mobile access point device" is intended to refer to access point devices that are mobile to some degree and, in use, tend to have a dynamic coverage area that changes as the aerial access point device moves. Aerial access point devices typically have a higher altitude than the terrestrial counterpart. Aerial access point devices can be included in a vehicle or transport with the capacity for flight or hovering, such as an unmanned aerial vehicle (UAV), a plane, helicopter, balloon or zeppelin, and so forth. In this specification, terrestrial access point devices and aerial access point devices are used as separate classifications of type of access point (AP) device.

For some networks such as 4G, 5G, and others, the coverage provided by terrestrial access point (TAP) devices can be supplemented by aerial access point (AAP) devices. AAP devices can be used for multiple reasons. For example, AAP devices can be deployed to overcome a failure or absence of coverage witnessed by the TAP devices. AAP devices can be employed to extend the coverage of TAP devices or to increase the capacity of TAP devices within the existing service area. AAP device can further be deployed to, e.g., interconnect on-ground personnel device to command-and-control personnel devices such as in the event of wild fires or other disasters, military operations, and others.

In some cases hybrid aerial and terrestrial communication systems need to be created rapidly and it may be crucial that these systems deliver fast and reliable connectivity to the user equipment (UE). To meet these and other objectives, it is instructive to examine some of the differences between the coverage provided by an AAP device and that for a TAP device.

For example, AAP devices tend to be at higher altitudes than TAP devices. Such tends to result in few, if any, obstacles between the AAP device and the UE. As one consequence, the perceived signal strength determined by the UE tends to be greater than that for TAP devices. As another consequence, AAP devices can use smaller transmit power and/or antenna gains than TAP devices when communicating with UE. However, the coverage perceived at the UE can change rapidly, even when the UE is stationary, due to mobility of the AAP, which typically is not the case for coverage provided by TAP devices.

Due to these and other differences between the coverage provided by TAP devices versus AAP devices, certain connectivity issues may arise in the hybrid network. For example, when TAP device coverage and AAP device coverage overlap, UEs in the overlapping coverage area may perform frequent handovers between the two. In some embodiments, frequent handovers back and forth between the TAP and AAP devices (e.g., 'ping-pong') can create unnecessary latency, excess power consumption, excess signaling, and the like, which can lead to inefficiency and lower quality of service, as well as increasing the likelihood of the communication session being dropped. In other words, hybrid aerial-terrestrial networks face challenges that do not arise in connection with conventional terrestrial-only networks. Such is due at least in part to the fact that AAP devices are themselves "mobile" to some degree, and to the fact that coverage areas of AAP devices and those for TAP devices can be very different in some ways when perceived by the UE, whether due to this added mobility dimension, to signal strength advantages of AAP device signals relative to TAP device signals, or to other reasons.

To understand why the propensity for 'ping-pong' exists in hybrid networks, it is instructive to consider the handover process that is typically used in modern wireless networks. For intra-frequency mobility in cellular long term evolution (LTE) networks and beyond, for example, a handover process is triggered as soon as the condition for the so-called "A3 event" measurement reporting becomes true. FIG. 1A is a block diagram of table 100a, illustrating common triggering condition summaries for various events. This A3 event, which is accentuated with indicator 102, instructs the network devices to perform a handover process, transferring service provided for a UE from the serving AP device to a neighbor AP device.

For instance, the A3 event is triggered when measurements (e.g., signal strength metrics) taken by a UE device indicate a neighbor access point device can better serve the UE than the current serving access point device. In order to determine that the neighbor access point device can better serve the UE, the network attempts to manage the conflicting goals of attempting to minimize the likelihood of dropped calls, which tends to lead to lower threshold conditions, while on the other hand attempting to minimize unnecessary handovers, which tends to lead to higher threshold conditions.

LTE standards define mobility robustness optimization (MRO) as a mechanism to manage those conflicting requirements. In that regard, LTE standards define two configurable parameters that govern performance of handover procedures. These configurable parameters are: time-to-trigger (TTT) and hysteresis (HYS). In more detail, HYS represents a minimum threshold by which a signal strength metric of a neighbor AP device must exceed the signal strength metric of the serving AP device in order trigger the A3 event. In other words, the neighbor AP device not only needs to exceed the serving AP device in terms of some signal strength metric, but must exceed such at least by the amount indicated by the HYS value. TTT represents a minimum amount of time that HYS must be satisfied before triggering the A3 event. In other words, in order to determine that a neighbor AP device can better serve the UE, the UE can determine that a signal strength metric of the neighbor AP device exceeds the signal strength of the serving AP device by an amount equal to or exceeding the HYS value for a duration equal to or exceeding the TTT value. When the above condition is satisfied, the UE reports back to the serving AP device, the perceived signal strength of both the serving AP device and the neighbor AP device with an A3 event report that identifies the neighbor AP device that is able to better serve the UE.

Figure 1B:
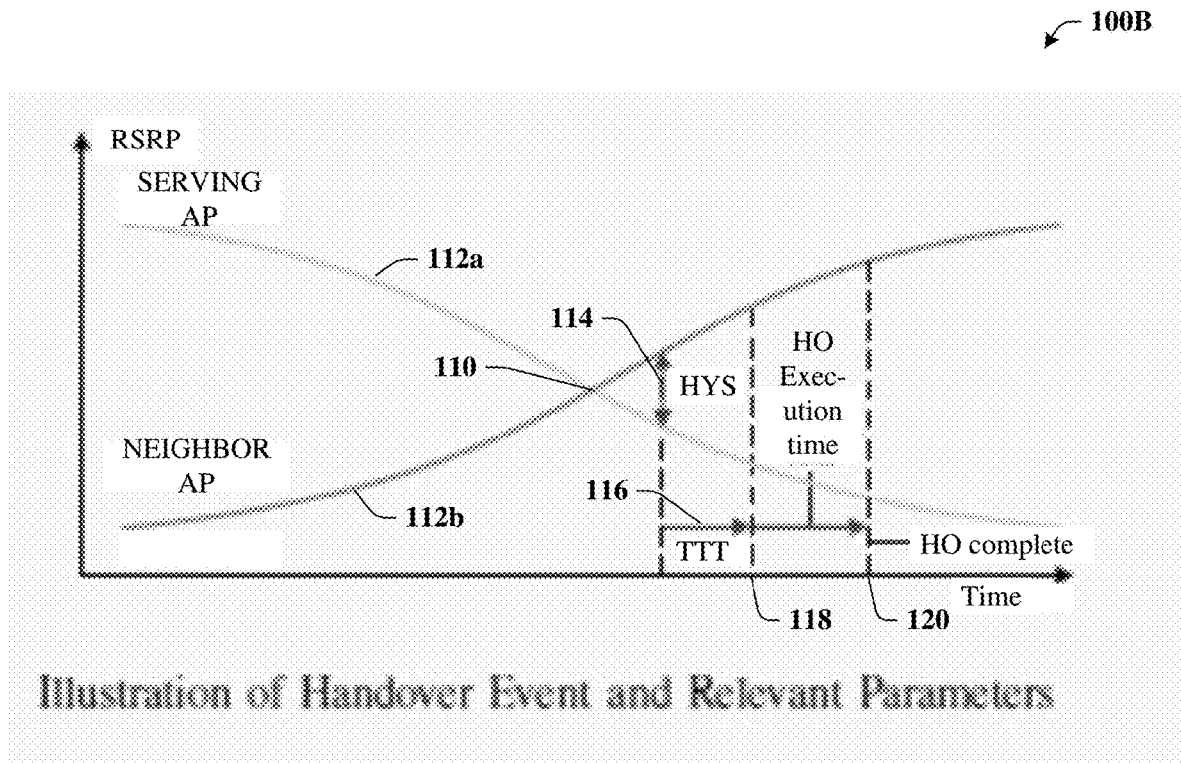
FIG. 1B depicts a graph plotting a signal strength metric over time and further illustrates an example of the A3 event becoming true and a handover procedure being initiated in response in accordance with certain embodiments of this disclosure.

FIG. 1B depicts a graph 100B plotting a signal strength metric over time and illustrates an example of the A3 event becoming true and a handover procedure being initiated in response. Here the signal strength metric being used is reference signal received power (RSRP), but it is appreciated that other types of signal strength metrics can be used, such as other received signal strength indicators (RSSI). FIG. 100B plots a gradually declining RSRP of the serving AP device, as indicated by curve 112a, and a gradually increasing RSRP of the neighbor AP device, as indicated by curve 112b. The curves cross at reference numeral 110, after which the RSRP of the neighbor AP device remains higher than that for the serving AP device. At some later time, the RSRP of the neighbor AP device, as measured by the UE device, not only exceeds the RSRP of the serving AP device but does so by an amount equal or greater than HYS 114. Provided the RSRP of the neighbor AP device exceeds the RSRP of the serving AP device by HYS 114 for at least the TTT 116, then the A3 event can be triggered and the handover procedure can be initiated at reference numeral 118. The handover procedure completes at some later time, as illustrated by reference numeral 120, and the previous neighbor AP device becomes the serving AP device that serves the UE.

As can be seen from the above simplistic example, configuring the values of HYS and TTT can significantly affect both the number of dropped calls and the number of unnecessary handovers. Traditional MRO procedures aimed at optimizing the values of HYS and TTT rely on radio link failure (RLF) event reporting to determine optimal values of HYS and TTT. RLF events are reports sent by the UE to the current serving AP device after a handover has failed. This report is used by MRO procedures to identify or infer the reason of the handover failure. Once identified, the MRO procedure can attempt to optimize the values of TTT and HYS in an effort to minimize or eliminate further RLF events.

However, conventional MRO procedures have certain shortcomings. First, the optimization procedure may require a large number of RLF events. Since the data used by MRO procedures gets generated only after an RLF (e.g., a dropped call), service may be subpar while the MRO procedures are tuning the values of TTT and HYS and collecting the data necessary to do so. Moreover, MRO procedures are typically implemented for an individual cell or AP device and the results are substantially unique for that cell. Finally, conventional MRO procedures that are optimized for terrestrial-based AP devices tend to be insufficient for hybridization of the network, as evidenced, for instance, by the substantially amount of 'ping-pong' witnessed when a terrestrial-only network is supplemented with aerial AP device service.

As noted above, UE devices at or near locations where coverage between a TAP device and an AAP device overlap may experience frequent ping-pong type handovers. Such can increase signaling overhead for the network overall, battery power drainage for both the UE and the AAP device, excess power consumption for the TAP device, a rise of RLF events, and other issues. Moreover, handover failures can result in retransmission or reconnection procedures, which can increase latency.

One reason for the above-noted issues is that current LTE handover mechanisms are tailored to 'static' terrestrial-based AP device, as are the MRO settings. For these types of networks, it is presumed that mobility comes from the UE alone. LTE offers self-optimized handover techniques (as part of MRO procedures), but as mentioned, such typically requires large numbers of RLF events in order to converge to an optimum handover setting solution. Further, due to 'double mobility', where mobility may come from either or both the UE or the AP (e.g., AAP devices), an optimum handover setting solution may take even longer when performed in the conventional manner Such may not be acceptable for many implementations of hybrid aerial and terrestrial networks, particularly those that are deployed or expanded in response to emergencies. In other words, having poor service and/or frequent dropped calls while the MRO attempts to optimize may not be an option for some hybrid networks or may be a much less desirable option.

The disclosed subject matter, in some embodiments, is directed to reducing or mitigating ping-pong handover issues that occur in hybrid networks. As used herein, 'ping-pong' handover issues relate to unnecessary handovers between TAP devices and AAP devices or frequently switching the serving AP between two or a small set of three or more AP devices. In some embodiments, AAP devices that extend coverage of TAP devices can be identified. In that regard, if both the neighbor and the serving AP devices are TAP devices, then conventional techniques (e.g., MRO) can be employed to optimize handover settings (e.g., HYS and TTT). On the other hand, if a neighbor (or serving) AP device is identified as an AAP device, then the disclosed techniques can be invoked. Such can allow existing networks to be readily updated to implement the disclosed techniques.

AAP devices that extend coverage of TAP devices typically provide overlapping coverage at or near a cell edge of the TAP device. As used herein, a cell edge is intended to refer to portions of the coverage area that have a low signal strength due, either to distance from the source of the signal (e.g., cell edges at the geographic boundaries of a cell), or objects (e.g., buildings) interfering with the signal. Hence, cell edges can exist due to distance or morphology. Regardless, UE devices in the overlapping coverage areas (e.g., at or near a cell edge of the serving AP device) are particularly susceptible to ping-pong handover issues. It is noted that in some hybrid networks, AAP devices are employed to increase capacity rather than to extend coverage. In those cases, the coverage provided by the AAP device is often not at or near a cell edge of the serving AP device. In those cases, the risk of ping-pong handover issues may be quite low, but insofar as ping-pong issues do arise in those implementations, the disclosed techniques can be employed, regardless of whether the AAP devices of a hybrid network are employed to extend coverage or increase capacity.

Advantageously, the disclosed subject matter can, in some embodiments, employ event prediction techniques to, e.g., estimate the likelihood of ping-pong issues arising. Such can be contrasted with conventional MRO techniques that merely react to the issues after they occur. For example, in some embodiments, the disclosed techniques can adjust handover settings (e.g., HYS and TTT) to prevent ping-pong issues from happening at all, which can be desirable, if not necessary or mandatory, for some hybrid networks, particularly those that are deployed rapidly and with great urgency.

To accomplish the above, in some embodiments, handover settings such as HYS and TTT can be updated based on UE location data and UE mobility data. UE location data can represent the respective locations of all or a subset of UE devices served by the serving AP device with respect to cell edges of the serving AP device. In some embodiments, it is not necessary to determine precise coordinate locations of the UE devices, but rather simply whether or not the UE devices are at or near a cell edge of the serving AP device. From the UE location data, it can be readily determined how many or what percentage of UE devices are at or near a cell edge from among all or some portion of the UE devices being served by the serving AP device. The UE mobility data can represent mobility metrics of respective UE devices served by the serving AP device. For example, UE mobility data can be utilized to determine a number or percentage of UE devices that are moving toward or nearing the coverage area of the neighbor AP device and/or moving toward or at the boundaries of overlapping coverage areas.

Based on the UE location data and the UE mobility data, forecasts of the likelihood of ping-pong issues arising can be estimated, and HYS, TTT, or another relevant handover setting can be updated by an appropriate amount to mitigate those issues from occurring. Examples of such are further detailed below.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Figure 2:
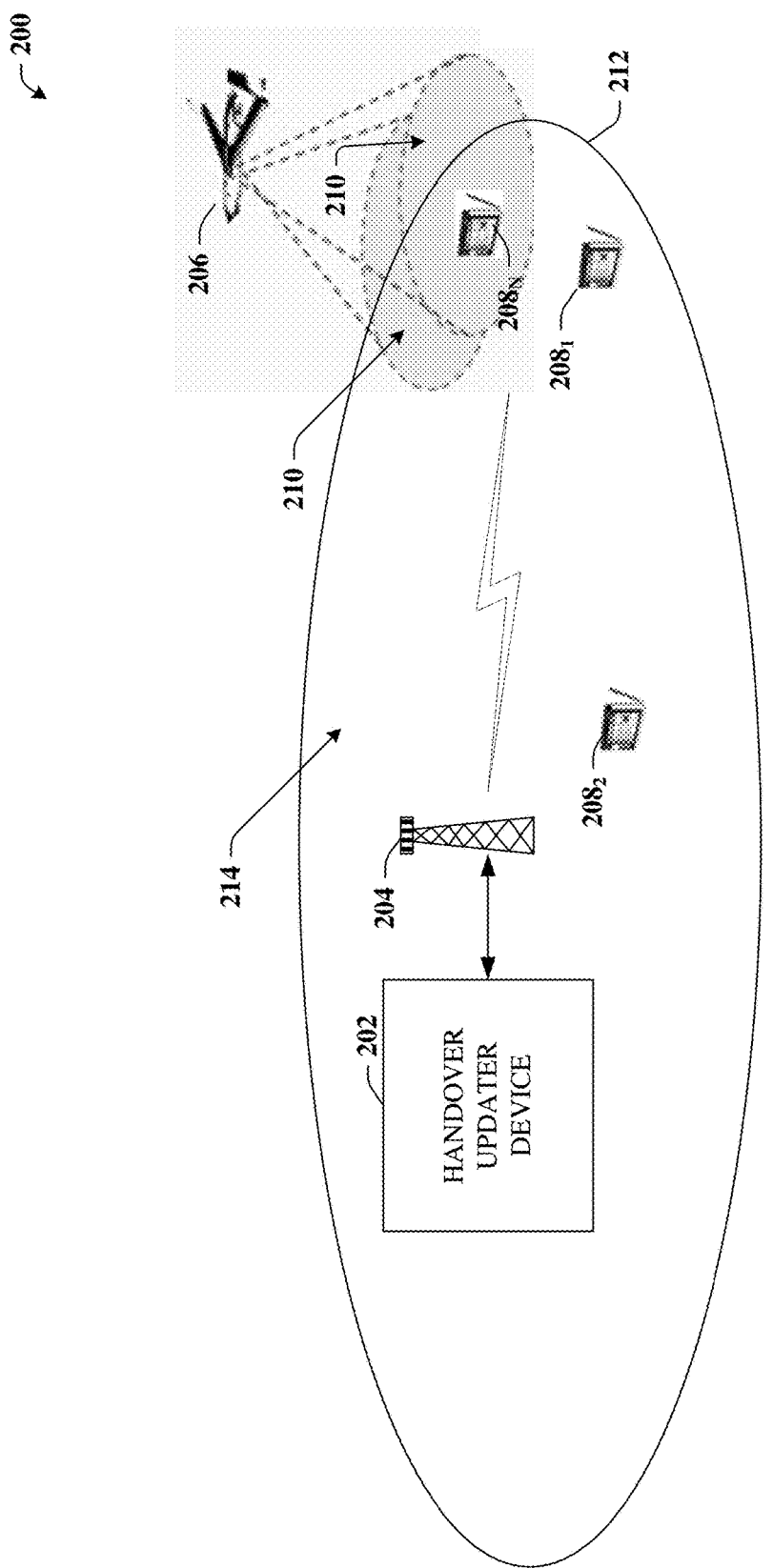
FIG. 2 is a graphical depiction of an example hybrid network is depicted with a handover updater device that can mitigate potential ping-pong issues or other issues that could arise in a hybrid network in accordance with certain embodiments of this disclosure.

Referring again to the drawings, with reference to FIG. 2, an example hybrid network 200 is depicted. In accordance with the disclosed subject matter, hybrid network 200 can comprise handover updater device 202. Handover updater device 202 can, inter alia, mitigate handover issues that arise in certain networks, such as hybrid network 200, that utilize a combination of terrestrial AP devices (e.g., TAP device 204) and mobile or aerial AP devices (e.g., AAP device 206) to provide service to user equipment devices (e.g., UE $208_1$-$208_N$) that are within service area 214 of TAP device 204. Handover updater device 202 can be included in an AP device such as TAP 204 or AAP 206, or be remotely situated. Generally, handover updater device 202 can comprise a processor and a memory that stores executable instructions that, when executed by the processor, facilitate performance of operations. Examples of the memory and processor can be found with reference to FIG. 10. It is to be appreciated that the computer 1002 can represent a server device of a communications network or a user equipment device and can be used in connection with implementing one or more of the systems, devices, or components shown and described in connection with FIG. 2 and other figures disclosed herein.

As previously noted, when AAP device(s) 206 are employed to extend coverage of TAP device(s) 204, the coverage area(s) 210 of AAP device 206 are typically at or near a cell edge 212 of TAP device 204. UE devices situated at or near cell edge 212 (e.g., UE $208_1$ or UE $208_N$) typically measure the signal strength from TAP device 204 as being much lower than similar measurements taken by UE devices that are not at or near a cell edge 212 (e.g., UE $208_2$). In FIG. 2, assuming TAP device 204 is initially the serving AP device for all UE 208, likely results are as follows.

UE $208_N$, which is well within the coverage area 210 of AAP 206 will measure much better signal strength from AAP device 206 than from TAP device 204 and thereafter generate an A3 event report. This report can be transmitted to the serving AP device (e.g., TAP device 204) and typically includes the perceived signal strength measurements of both the serving AP device (e.g., TAP device 204) and the candidate neighbor AP device (e.g., AAP device 206). In response to the A3 event report, a handover procedure can be initiated and AAP device 206 can become the serving AP device for UE $208_N$. Without any further changes being identified, this outcome is desired by the network. Since UE $208_N$ falls squarely in the service area 210 of AAP device

206, it is desirable that AAP device 206 be the serving AP device. It is noted that UE 208$_N$ is at or near a cell edge 212 of TAP device 204, so it is unlikely that signal strength measurements of TAP device 204 will surpass those of AAP device 206 in the immediate future. Thus, ping-pong issues are not likely to arise by for UE 208$_N$.

UE 208$_2$ likely has excellent signal strength readings from TAP device 204 and low, if any, detectable signal strength readings from AAP 206. Hence, U E 208$_2$ is not likely to generate an A3 event report, but rather continue with TAP device 204 as the serving AP device. Here, as well, ping-pong issues are not likely to arise without significant changes to the system.

However, UE 208$_1$ presents a different situation, one where ping-pong issues are highly likely. UE 208$_1$ is at or near cell edge 212, so the strength of signals from TAP device 204 are likely to be low. UE 208$_1$ is near to service area 210 of AAP 206, but is likely to measure low strength of signals from AAP 206. Due to mobility from either AAP 206 or UE 208$_1$ or other factors, the signal strength measurements determined by UE 208$_1$ can rapidly and frequently change from favoring TAP 204 over AAP 206 and vice versa. As one result, UE 208$_1$ is likely to frequently perform handovers back and forth between the two AP devices.

In order to mitigate these and other issues, in some embodiments, handover updater device 202 can update handover settings such as HYS and TTT in a manner aimed at reducing potential ping-pong or RLF issues, which is further detailed in connection with FIG. 3. Assuming TAP device 204 has been in service for some time, the handover settings employed are likely optimized (via MRO procedures) for static terrestrial networks. The disclosed techniques can improve those settings to better handle the challenges of a hybrid network.

Figure 3:
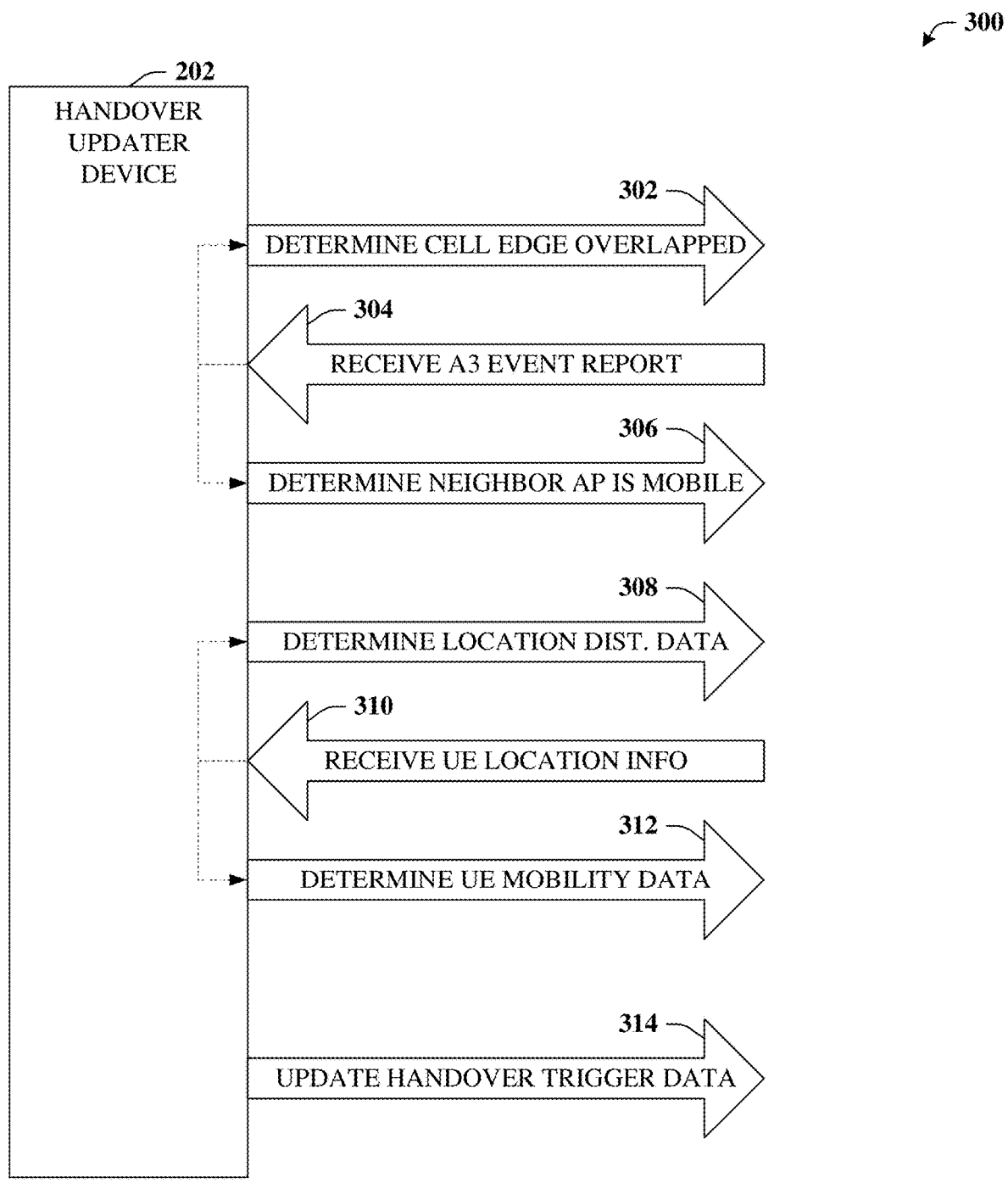
FIG. 3 depicts a block diagram of an example system that illustrating example functionality of the handover updater device in more detail in accordance with certain embodiments of this disclosure.

While still referring to FIG. 2, but turning now as well to FIG. 3, a block diagram 300 is depicted. Block diagram 300 illustrates example functionality of handover updater device 202 in more detail. For instance, reference numeral 302 illustrates handover updater device 202 can determine that a cell edge (e.g., cell edge 212) of a first service area (e.g., service area 214) provided by a first access point device (e.g., TAP device 204) is overlapped by a second service area (e.g., service area 210) provided by a second access point device (e.g., AAP 206). Determining that a cell edge is overlapped can be accomplished in a number of ways, which will be described momentarily.

Handover updater device 202 can further determine that the second access point device is a mobile and/or aerial access point device that is configured to transit from a first location to a second location during operations. In other words, the mobile access point device can provide service while mobile or stationary, but is configured to be capable of movement while serving UE devices. Such is illustrated by reference numeral 306. One mechanism to determine the neighbor access point device is a mobile access point device is by referencing a physical cell identity (PCI) associated with the neighbor device. In some embodiments, AAP devices can be assigned PCIs that distinguish them from terrestrial or stationary access point devices. Hence, handover updater device 202 can determine the neighbor access point device is an AAP device in response to receiving a specific PCI value or a PCI value in a specified range.

In some embodiments, handover updater device 202 can receive an A3 event report as illustrated by reference numeral 304. This A3 event report typically details a cell ID of a neighbor cell along with the signal strength metrics (e.g., RSRP) of both the neighbor cell and the serving cell the A3 event report is being provided to. Hence, the A3 event report can provide a rich source of information relevant to the disclosed techniques and can serve as a trigger for the determination made at reference numeral 302, 306 and others. However, it is understood that such information might be otherwise determined. For instance, at the time of deployment or movement of AAP 206, both an associated PCI and a target service area can be known, which can be used for determinations performed at reference numerals 302 and 306. Hence, it is not strictly necessary to receive an A3 event report from a UE device before performing the analysis and updating handover trigger data (detailed infra), but such represents one convenient mechanism that can leverage existing handover reporting mechanisms.

Handover updater device 202 can determine location distribution data, as illustrated by reference numeral 308. Location distribution data can be representative of a percentage of user equipment devices served by the first access point device (e.g., TAP device 204) that are located within a defined distance from the cell edge (e.g., cell edge 212). Based on the example provided in connection with FIG. 2, UE 208$_1$ and UE 208$_N$ would likely be identified as being at or near the cell edge, whereas UE 208$_2$ would not likely be identified as such. There may be hundreds or thousands of other UE devices (not shown) and an element of the location distribution data can indicate what percentage of UE devices, from among the hundreds or thousands of UE devices served by TAP device 204, are at or near cell edge 212.

In some embodiments, such information can be sourced from UE location information, which, as illustrated by reference numeral 310, can be received by handover updater device 202. In some embodiments, handover updater device 202 can generate all or a portion of the UE location information rather than receiving. Regardless, UE location information can be determined in a variety of ways. As one example, UE location information can be determined from signal strength metrics reported by the UE 208 being served. For instance, a weak signal (e.g., below a defined threshold) can be representative of being at a cell edge. Another technique can be to examine the modulating scheme being used by the UE. Certain modulating schemes can be implemented by the UE in response to low signal strength measurements and/or being at or near a cell edge. Still another mechanism to determine whether a given UE device is at or near a cell edge is to examine suitable location data such as GPS or triangulation techniques.

In some embodiments, handover updater device 202 can determine UE mobility data, as illustrated by reference numeral 312. UE mobility data can be representative of a percentage of user equipment devices served by the first access point device that are moving toward the second service area (e.g., service area 212). UE mobility data can be determined from the UE location information detailed in connection with reference numeral 310.

As illustrated at reference numeral 314, handover updater device 202 can update handover trigger data. This update to the handover trigger data can be based on the location distribution data and/or the mobility data. For example, the update can be a function of the percentage of UE devices near cell edge 212 and/or the percentage of UE devices that are moving toward service area 210. The handover trigger data can comprise condition(s) that, when satisfied, trigger a handover procedure. An example of such condition(s) can be the A3 event detailed in connection with FIG. 1A. Additional detail relating to updating the handover trigger data can be found with reference to FIG. 4.

Figure 4:
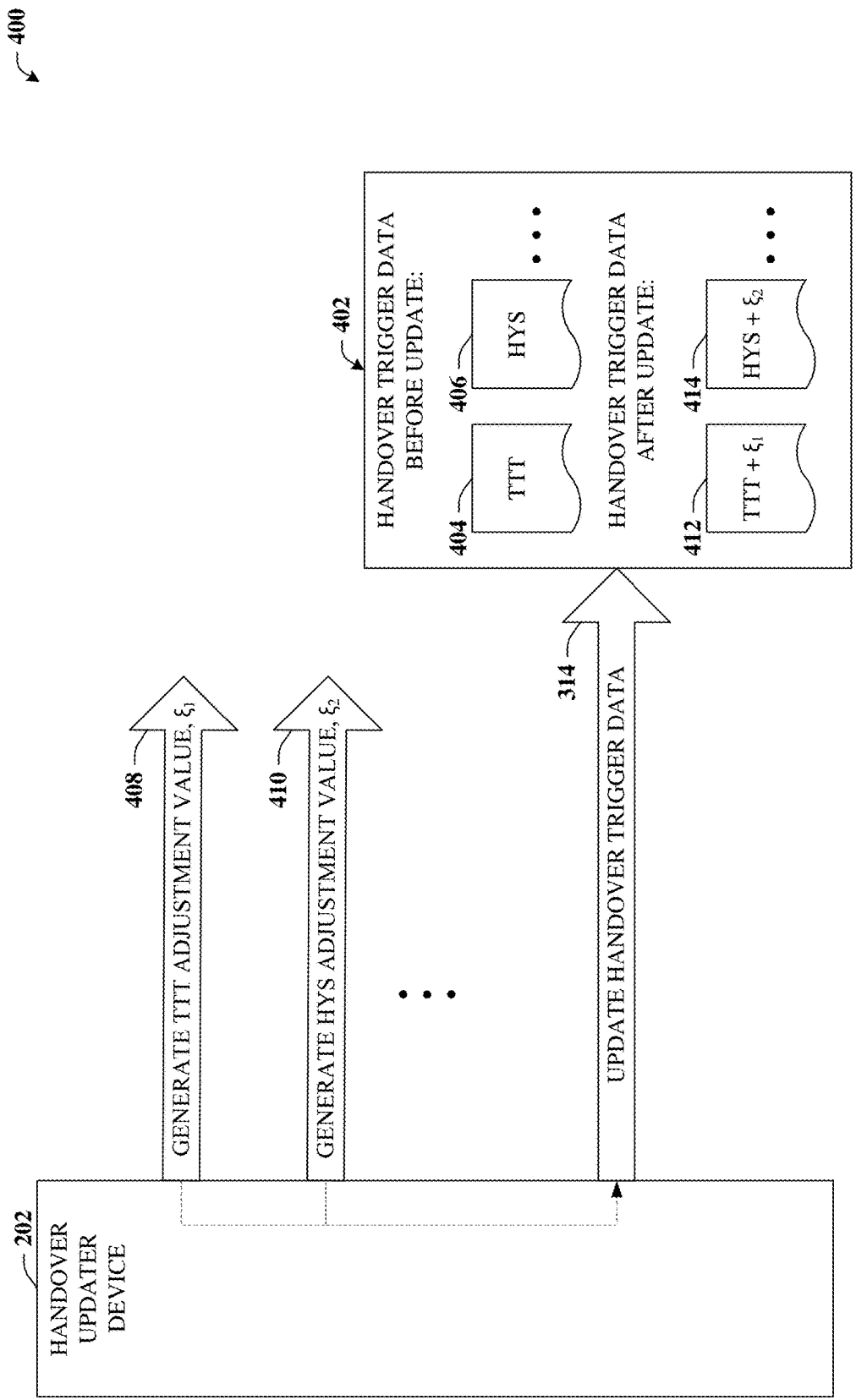
FIG. 4 illustrates a block diagram of an example system that can generate adjustments to handover trigger data in accordance with certain embodiments of this disclosure.

Turning now to FIG. 4, a block diagram of system 400 is depicted. System 400 can generate adjustments to handover trigger data 402. Such adjustments can be determined to mitigate or reduce ping-pong issues or other RLF issues in connection with a hybrid network. Handover trigger data 402 can include configurable parameters such as HYS 406, or other parameters used to determine when a handover procedure should be triggered. As noted, changing these parameters can significantly affect the extent to which RLF issues arise. Before being updated, values for TTT 404 and HYS 406 are likely optimized for terrestrial network scenarios. However, since an AAP device has been identified, it is likely that handover trigger data 402 can be adjusted to prevent certain issues before they arise and without implementing a lengthy MRO procedure.

For example, as illustrated by reference numeral 408, handover updater device 202 can generate a TTT adjustment value, denoted $\xi_1$. The TTT adjustment value can be generated as a function of the location distribution data and/or the mobility data. In other words, can determine the TTT adjustment value as a function of the percentage of UE that are at or near a cell edge and/or a percentage of UE that are moving toward the overlapping coverage regions. Similarly, as illustrated by reference numeral 410, handover updater device 202 can generate a HYS adjustment value, denoted $\xi_2$. The HYS adjustment value can also be generated as a function of the location distribution data and/or the mobility data. Thus, as with the TTT adjustment value, handover updater device 202 can determine the HYS adjustment value as a function of the percentage of UE that are at or near a cell edge and/or a percentage of UE that are moving toward the overlapping coverage regions. Following the update illustrated by reference numeral 314, handover trigger data 402 can be updated to reflect these changes as shown at reference numerals 412 and 414.

Figure 5:
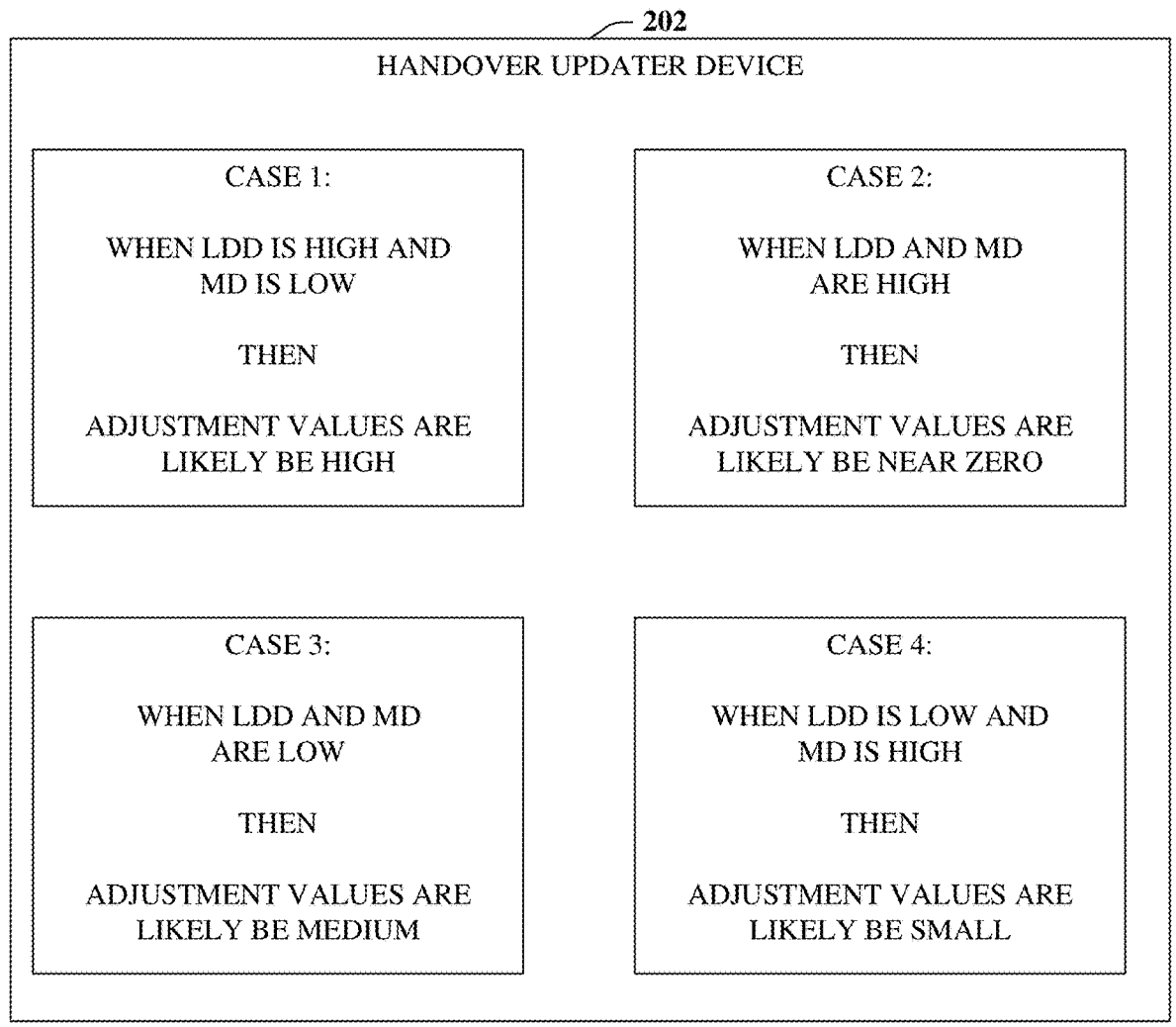
FIG. 5 illustrates a block diagram depicting example effects of location distribution data (LDD) and mobility data (MD) on the adjustment values in accordance with certain embodiments of this disclosure.

Referring now to FIG. 5, block diagram 500 is depicted. Diagram 500 illustrates example effects of location distribution data (LDD) and mobility data (MD) on the adjustment values detailed in connection with FIG. 4. For example, consider case 1 in which LDD (e.g., a percentage of UE at or near a cell edge) is high (e.g., above a defined threshold) and MD (e.g., a percentage of UE moving toward overlapping coverage) is low. In that case, handover updater device 202 will tend to generate adjustment values, and that are high. To aid in understanding why that is so, consider the following rationale.

If examination of the LDD reveals a significant number of UE are near the overlapping coverage between a TAP device and an AAP device, then ping-pong issues are certainly a concern. This concern is heightened by examination of MD that reveals, in this case, that the UE are not moving toward the AAP device and/or the overlapping coverage area. In other words, the UE, as a group, are not expected to cross into the service area of the AAP device where the AAP device can better serve those UE. This is similar to the situation detailed in connection with UE $208_1$ of FIG. 2. Since the potential for ping-pong issues are high for a significant number of UE served by the TAP device, handover updater device 202, can make the adjustment values, and high as well. When the adjustment values are high, then updated TTT and HYS values (e.g., a higher HYS and a longer TTT) will tend to make satisfaction of the A3 event conditions more difficult to achieve. As one result, UE near the overlapping coverage areas are less likely to exhibit ping-pong issues.

Case 2 illustrates a scenario in which examination of the LDD reveals a significant number of UE are near the overlapping coverage between a TAP device and an AAP device. However, unlike case 1, here, the MD indicates that the UE tend to be moving toward the AAP. Thus, it can be inferred that the UE are likely to transition into the service area of the AAP device, where the AAP device can provide good service without a high likely of ping-pong issues arising. As an example, consider again UE $208_1$, situated where ping-pong issues are a concern. However, since the MD suggests that UE $208_1$ may soon be situated at a location similar to UE $208_N$, where ping-pong issues are not a high concern, handover updater device 202 can infer it is desired to allow a normal handover event to occur when triggered. Thus, in this case, handover updater device 202, can determine adjustment values that are zero or near zero.

Case 3 illustrates a scenario in which examination of the LDD reveals a low number (e.g., number below a defined threshold) of UE are near the overlapping coverage between a TAP device and an AAP device. MD indicates that a low number of UE tend to be moving toward the AAP. Case 3 is similar to case 1 in that there is a risk of ping-pong issues because UE do not appear to be moving toward the AAP service area. However, since the number of UE in this situation is lower than for case 1, the adjustment values can be lower as well, while still mitigating the potential for ping-pong issues arising. Hence, in this case, handover updater device 202, can determine a medium value (e.g., below a defined high threshold and above a defined low threshold) for the values of $\xi_1$ and $\xi_2$.

Case 4 illustrates a scenario in which examination of the LDD reveals a low number (e.g., number below a defined threshold) of UE are near the overlapping coverage between a TAP device and an AAP device. MD indicates that a high number of UE tend to be moving toward the AAP. Case 4 is similar to case 2 in that a high number of UE appear to be moving toward the AAP service area. UE arriving in the service area of the AAP should be encouraged to handover. However, since there is no guarantee that all these UE will transition to the service area of the AAP, the likelihood of ping-pong issues for this case is slightly higher than for case 2. Hence, in this case, handover updater device 202, can determine a small value (e.g., below a defined high threshold but above the zero or near zero threshold for case 2) for the values of and It is understood that inferences or estimates relating to the adjustment values can be periodically updated in some embodiments. For example, since the state of the system is dynamic, with UE devices entering and existing the coverage areas of a given AP device as well as changing location and mobility directions, adjustment values determined at one time may differ from those determined at a subsequent time. Furthermore, it is understood that it is possible for adjustment values to have a negative value in some embodiments. For example, consider that handover updater device 202 determines a scenario similar to case 1, where adjustment values are high. At a later time, handover updater device 202 determines that the state of the system is similar to case 2, wherein adjustment values are indicated to be very low relative to a previous setting. Thus, adjustment values can operate to reduce previous HYS and TTT settings. Moreover, it is understood that handover updater device 202 can be configured in some embodiments to generate templates that can be exported to other AP devices. For instance, various templates that define a particular state of a system in terms of LDD and MD can be associated with corresponding values of adjustment values that were previously determined and/or identified to be particularly effective. Hence, an AP device, upon identifying a particular LDD, MD, or combination thereof, can select a matching template having suitable adjustment values for that situation.

Example Methods

Figure 6:
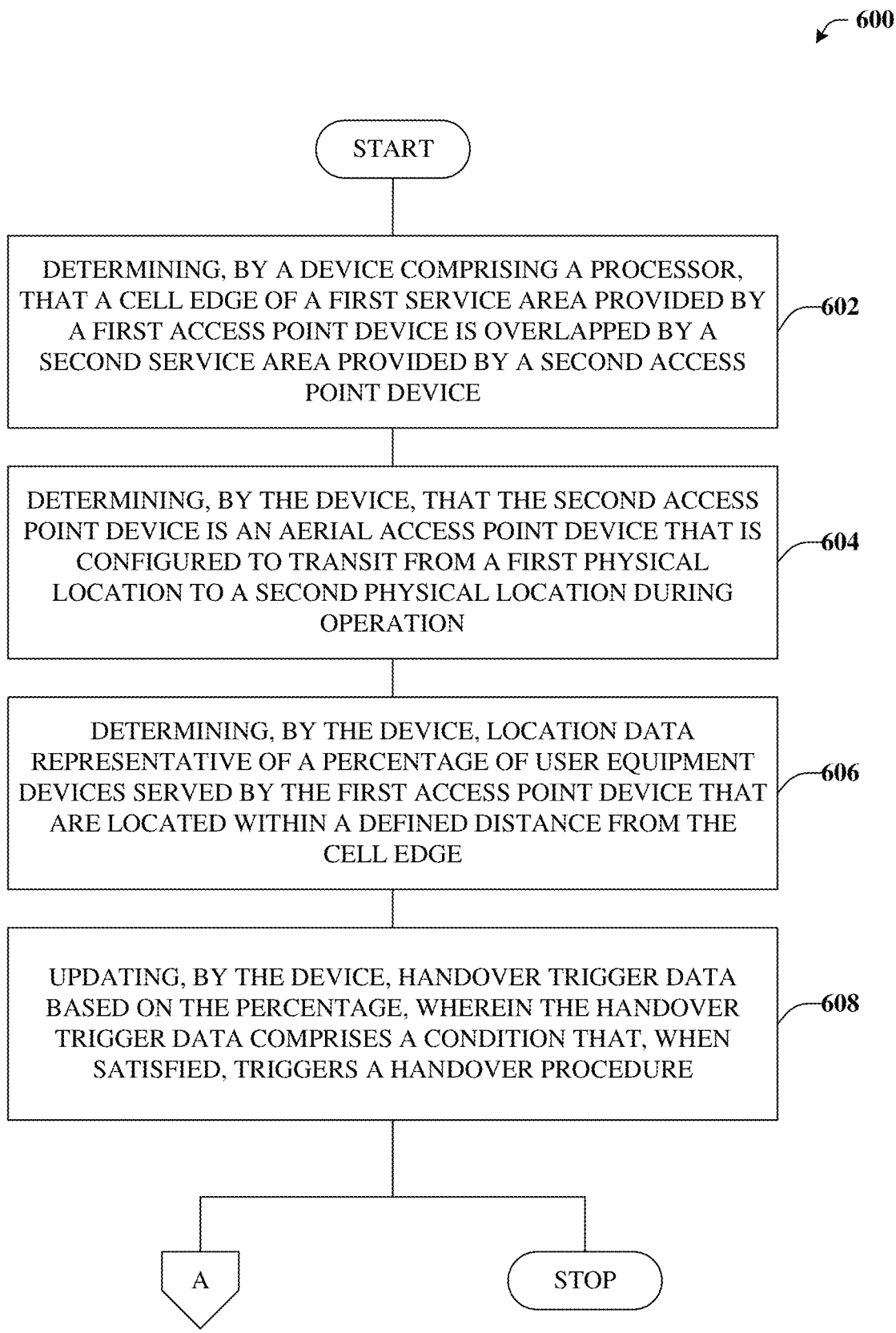
FIG. 6 illustrates an example methodology that can mitigate handover issues that arise in certain networks, such as hybrid networks that utilize a combination of terrestrial AP devices and mobile or aerial AP devices in accordance with certain embodiments of this disclosure.
Figure 7:
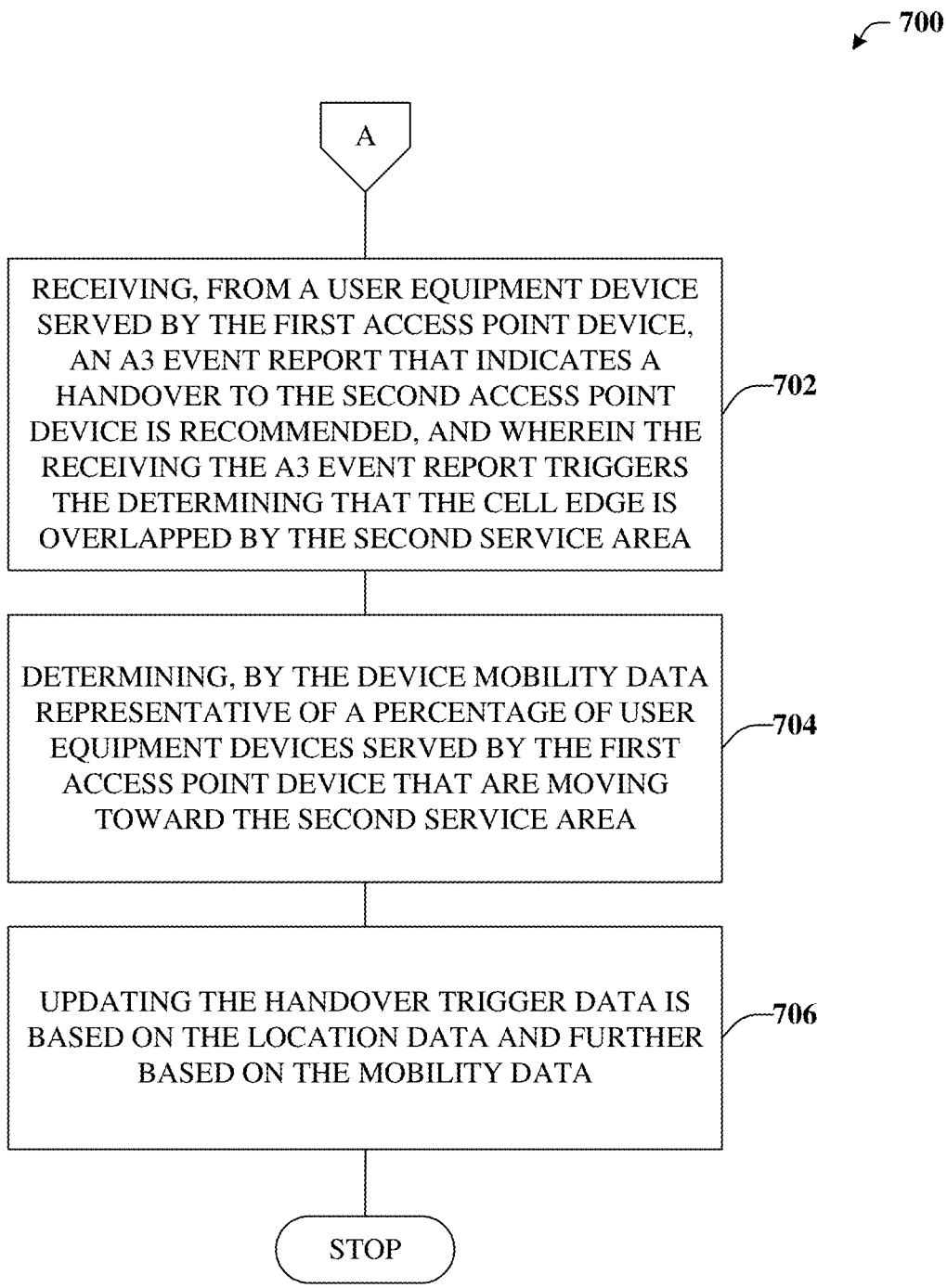
FIG. 7 illustrates an example methodology that can provide for additional elements or aspects in connection with mitigating handover issues in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can mitigate handover issues that arise in certain networks, such as hybrid networks that utilize a combination of terrestrial AP devices and mobile or aerial AP devices. For example, at reference numeral 602, a device comprising a processor can determine that a cell edge of a first service area provided by a first access point device is overlapped by a second service area provided by a second access point device.

At reference numeral 604, the device can determine that the second access point device is an aerial access point device that is configured to transit from a first physical location to a second physical location during operation. In some embodiments determining that the second access point device is an AAP device can be accomplished by examining a PCI associated with the second AP device. For instance, in accordance with the disclosed subject matter, AAP devices can be assigned PCI values that distinguish from TAP devices. Regardless, upon determining that the second AP device is an AAP device, it can be identified that the hybrid network in question may be susceptible to ping-pong issues since conventional handover trigger settings (e.g., determined by MRO procedures) are typically optimized for terrestrial-only networks.

At reference numeral 606, the device can determine location data representative of a percentage of user equipment devices served by the first access point device that are located within a defined distance from the cell edge. In other words, a distribution of the locations of all or a portion of the UE served by the AP device can be determined relative to the cell edge.

At reference numeral 608, the device can update handover trigger data based on the percentage, wherein the handover trigger data comprises a condition that, when satisfied, triggers a handover procedure. Method 600 can proceed to insert A, which is further detailed in connection with FIG. 7, or stop.

With reference now to FIG. 7, exemplary method 700 is illustrated. Method 700 can provide for additional elements or aspects in connection with mitigating handover issues. For example, at reference numeral 702, the device can receive an A3 event report from a user equipment device served by the first access point device. The A3 event report can indicate a handover to the second access point device is recommended. In some embodiments, receiving the A3 event report can trigger the determining that the cell edge is overlapped by the second service area detailed in connection with reference numeral 602 of FIG. 6 and/or other determinations or functions detailed herein.

At reference numeral 704, device can determine mobility data representative of a percentage of user equipment devices served by the first access point device that are moving toward the second service area. Like location data, mobility data can be analyzed to determine adjustments to handover trigger data that are deemed to mitigate potential ping-pong issues.

At reference numeral 706, the device can update the handover trigger data is based on the location data and further based on the mobility data. In that regard, it is understood that either one or both location data (e.g., location distribution information of the UE) or mobility data (e.g., information indicating movement toward the overlapping coverage) can be employed to identify adjustments to HYS parameter values, TTT parameter values, or other parameters of handover trigger data that set the threshold conditions that must be satisfied to recommend or implement a handover procedure.

Example Operating Environments

Figure 8:
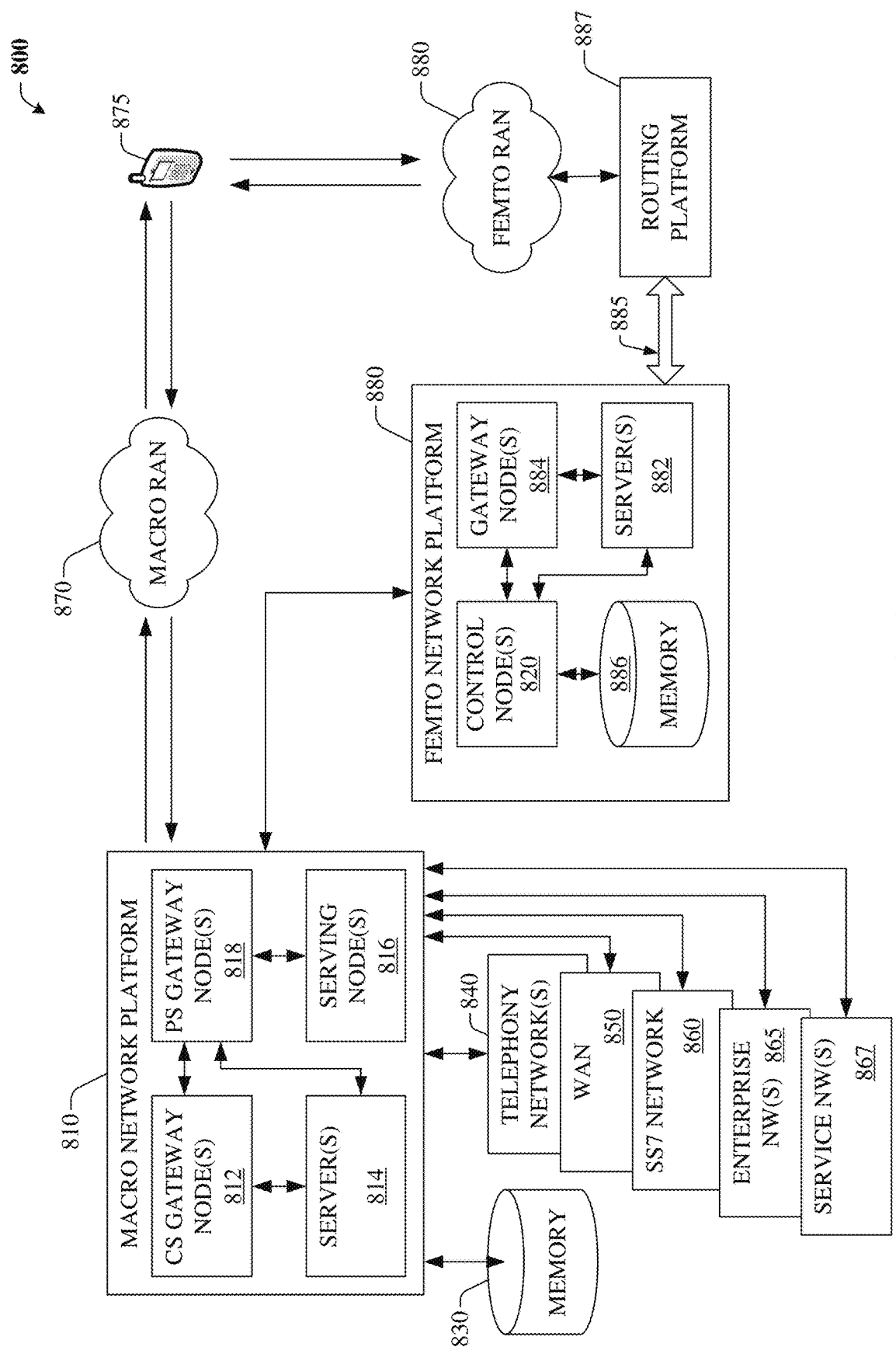
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
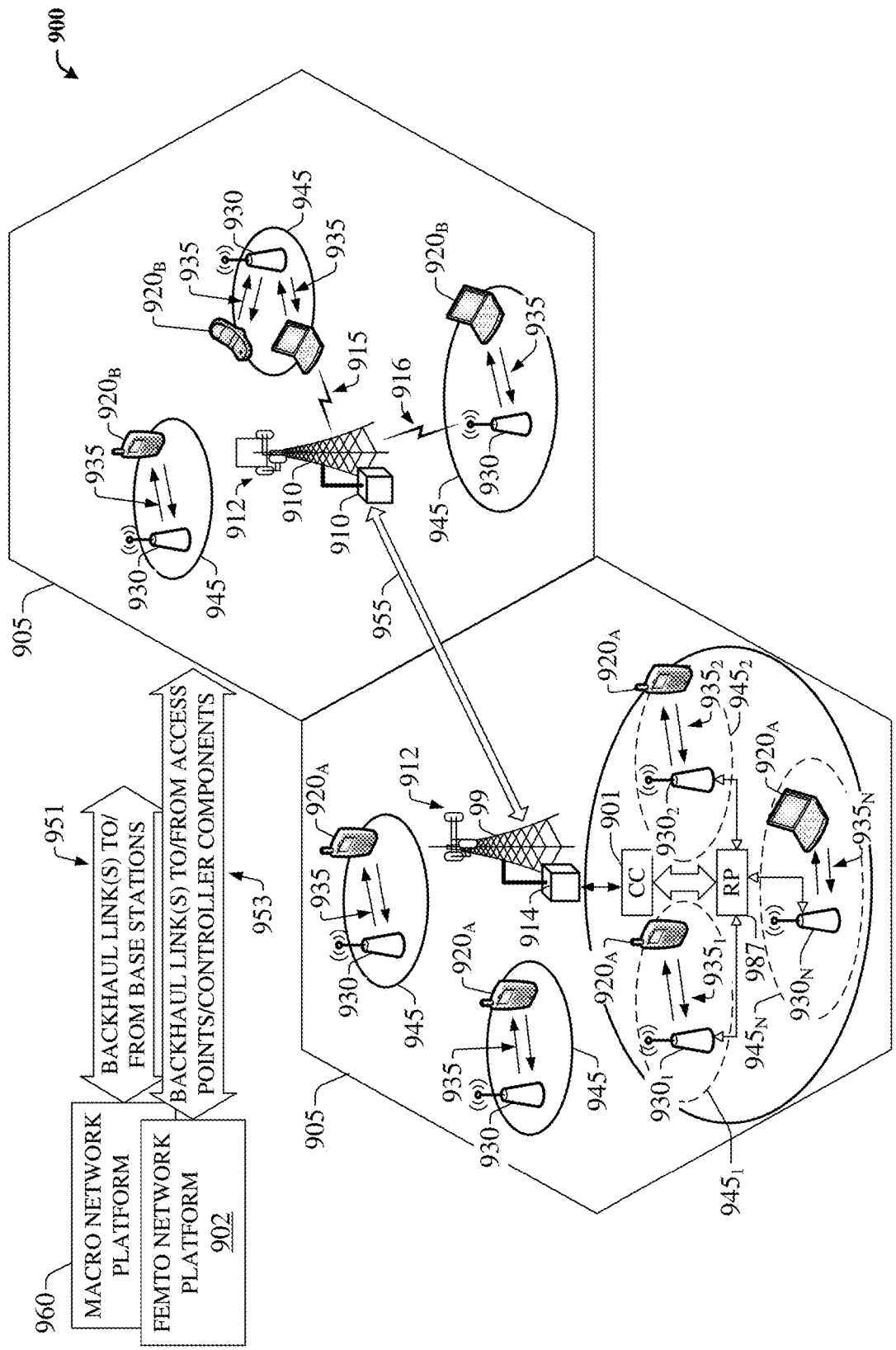
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE 920A, 920B, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE 920A, 920B can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920A can be routed by the RP 987, for example, internally, to another UE 920A connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE 920A connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
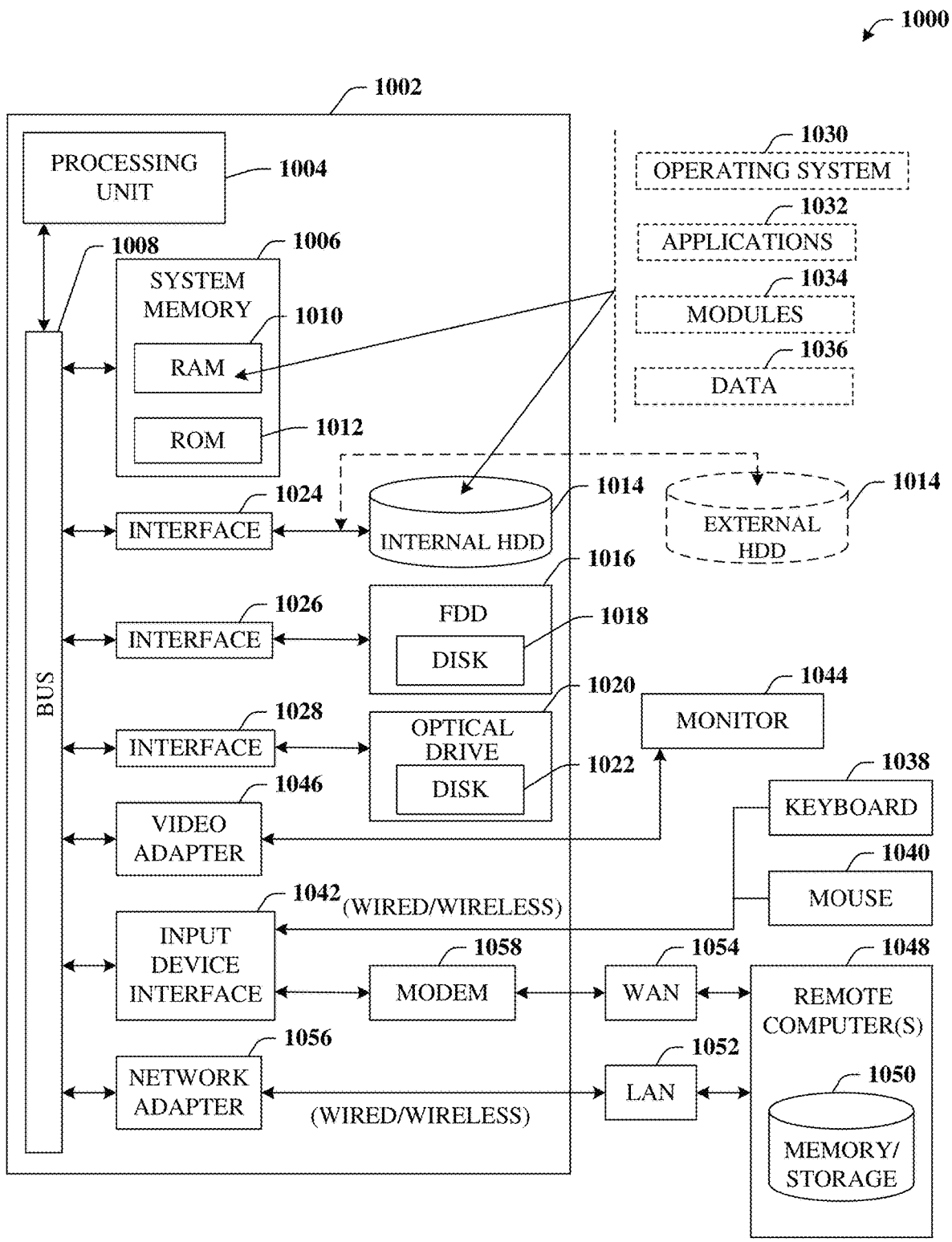
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter comprises a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also comprise a high-speed RAM such as static RAM for caching data.

The computer 1002 further comprises an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically comprises other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A device, comprising:
a processor; and
a memory that stores executable instructions that, when executed by the processor, facilitate performance of operations, comprising:
determining that a cell edge of a first service area provided by a first access point device is overlapped by a second service area provided by a second access point device;
determining that the second access point device is a mobile access point device that is configured to transit from a first physical location to a second physical location during operation;
determining location distribution data representative of a first percentage of user equipment devices served by the first access point device that are located within a first defined distance from the cell edge;
determining mobility data representative of a second percentage of user equipment devices served by the first access point device that are moving toward the second service area; and
updating handover trigger data based on the location distribution data, wherein the handover trigger data comprises a condition that, when satisfied, triggers a handover procedure.

2. The device of claim 1, wherein the condition is satisfied when a user equipment of the user equipment devices determines that a first signal strength metric of a neighbor access point device, which neighbors a serving access point device, exceeds a second signal strength metric of the serving access point device by a hysteresis value of the handover trigger data.

3. The device of claim 2, wherein the condition is satisfied when the user equipment determines that the first signal strength metric exceeds the second signal strength metric by the hysteresis value for a period that exceeds a time-to-trigger value of the handover trigger data.

4. The device of claim 1, wherein the operations further comprise:
updating the handover trigger data based on the location distribution data and the mobility data.

5. The device of claim 4, wherein the updating the handover trigger data comprises:
generating, as a function of the location distribution data and the mobility data, a first adjustment value indicative of a first amount by which to adjust a hysteresis value of the handover trigger data; and
generating, as a function of the location distribution data and the mobility data, a second adjustment value indicative of a second amount by which to adjust a time-to-trigger value of the handover trigger data.

6. The device of claim 5, wherein the first adjustment value and the second adjustment value are large, characterized as being determined to respectively exceed first corresponding defined thresholds, in response to the first percentage being determined to be above a first defined threshold and the second percentage being determined to be below a second defined threshold.

7. The device of claim 5, wherein the first adjustment value and the second adjustment value are near-zero, characterized as respectively being determined to be less than first corresponding defined thresholds, in response to the first percentage and the second percentage being respectively determined to exceed second corresponding defined thresholds.

8. The device of claim 5, wherein the first adjustment value and the second adjustment value are medium, characterized as respectively being determined to be less than corresponding defined high thresholds and greater than corresponding defined low thresholds, in response to the first percentage and the second percentage being respectively determined to be less than second corresponding defined thresholds.

9. The device of claim 5, wherein the first adjustment value and the second adjustment value are small, characterized as respectively being determined to be less than first corresponding defined thresholds, in response to the first percentage being determined to be below a first defined threshold and the second percentage being determined to be above a second defined threshold.

10. The device of claim 1, wherein the determining that the cell edge is overlapped by the second service area is in response to receiving, from a user equipment device served by the first access point device, an A3 event report that indicates conditions to trigger a handover to the second access point device have been satisfied.

11. The device of claim 1, wherein the determining that the second access point device is the mobile access point device is based on a value of a physical cell identity that is assigned to the second access point device.

12. The device of claim 1, wherein the cell edge is representative of portions of the first service area in which a signal strength metric determined by a user equipment device is below a defined threshold.

13. A non-transitory machine-readable storage medium, comprising executable instructions that, when executed by a processor, facilitate performance of operations, comprising:
determining that a cell edge of a first service area provided by a first access point device is overlapped by a second service area provided by a second access point device;
determining that the first access point device is a terrestrial access point device configured to remain stationary while providing service, and that the second access point device is an aerial access point device that is configured to provide service while in motion;
determining location data representative of a first percentage of user equipment devices served by the first access point device that are located within a first defined distance from the cell edge;
determining mobility data representative of a second percentage of user equipment devices served by the first access point device that are moving toward the second service area; and
updating handover trigger data based on the first percentage, wherein the handover trigger data comprises a condition that, when satisfied, triggers a handover procedure.

14. The non-transitory machine-readable storage medium of claim 13, wherein the updating the handover trigger data is based on the location data and the mobility data.

15. The non-transitory machine-readable storage medium of claim 13, wherein the updating the handover trigger data comprises:
updating a hysteresis value of the handover trigger data by a first amount that is determined based on the location data and the mobility data, and wherein the hysteresis value is an amount by which a first signal strength metric of a neighbor access point device is to exceed a second signal strength metric of a serving access point device in order to trigger the handover procedure; and updating a time-to-trigger value of the handover trigger data by a second amount that is determined based on the location data and the mobility data, and wherein the time-to-trigger value is a length of time the first signal strength metric is to exceed the second signal strength metric by the hysteresis value in order to trigger the handover procedure.

16. The non-transitory machine-readable storage medium of claim 13, wherein the location data is representative of the first percentage of user equipment devices served by the first access point device that are located within a first defined distance from the cell edge and located outside of the second service area.

17. A method, comprising:
   determining, by a device comprising a processor, that a cell edge of a first service area facilitated by a first access point device is overlapped by a second service area facilitated by a second access point device;
   determining, by the device, that the second access point device is an aerial access point device that is configured to transit from a first physical location to a second physical location during operation;
   determining, by the device, location data representative of a first percentage of user equipment devices served by the first access point device that are located within a defined distance from the cell edge;
   determining, by the device, mobility data representative of a second percentage of user equipment devices served by the first access point device that are moving toward the second service area; and
   updating, by the device, handover trigger data based on the first percentage, wherein the handover trigger data comprises condition data representative of a condition, and wherein a handover procedure is triggered in respect to the condition being determined to be satisfied.

18. The method of claim 17, wherein the operations further comprise receiving, from a user equipment device served by the first access point device, an A3 event report that indicates a handover to the second access point device is recommended, and wherein the receiving the A3 event report triggers the determining that the cell edge is overlapped by the second service area.

19. The method of claim 17, wherein the updating the handover trigger data is based on the location data and further based on the mobility data.

20. The method of claim 17, wherein the determining the location data further comprises determining the first percentage of user equipment devices served by the first access point device that are located within a defined distance from the cell edge and located outside of the second service area.

* * * * *